US008807883B2

(12) United States Patent
Lutz (10) Patent No.: US 8,807,883 B2
(45) Date of Patent: Aug. 19, 2014

(54) KNIFE FOR THE MACHINING OF SPOT WELDING ELECTRODES, CUTTING TOOL AND CAP CUTTER

(75) Inventor: Peter Lutz, München (DE)

(73) Assignee: Lutz Precision, K.S., Bratislava (SK)

( * ) Notice: Subject to any disclaimer, the term of this patent is extended or adjusted under 35 U.S.C. 154(b) by 1009 days.

(21) Appl. No.: 12/865,100

(22) PCT Filed: Jan. 29, 2009

(86) PCT No.: PCT/EP2009/000575
§ 371 (c)(1),
(2), (4) Date: Nov. 10, 2011

(87) PCT Pub. No.: WO2009/095237
PCT Pub. Date: Aug. 6, 2009

(65) Prior Publication Data
US 2012/0093593 A1      Apr. 19, 2012

(30) Foreign Application Priority Data

Jan. 30, 2008   (DE) .......................... 10 2008 006 703

(51) Int. Cl.
*B23C 3/12*           (2006.01)
(52) U.S. Cl.
USPC ............... 407/61; 407/62; 409/140; 409/139; 409/138
(58) Field of Classification Search
USPC ........... 409/140, 139, 138; 407/61, 62, 53, 54
See application file for complete search history.

(56) References Cited

U.S. PATENT DOCUMENTS

| 2,201,159 | A | * | 5/1940 | Clow | 175/394 |
| 4,966,504 | A | * | 10/1990 | Seme et al. | 409/140 |
| 5,725,340 | A | * | 3/1998 | Nakajima et al. | 409/140 |
| 7,658,575 | B2 | * | 2/2010 | Nomura | 408/144 |
| 2006/0099037 | A1 | | 5/2006 | Nordstrom et al. | |

FOREIGN PATENT DOCUMENTS

| CN | 101043964 A |   | 9/2007 |
| DE | 10345714 A1 | * | 4/2005 |
| EP | 0844040 |   | 5/1998 |

(Continued)

OTHER PUBLICATIONS

PCT Translation of the International Preliminary Report on Patentability, dated Sep. 28, 2010, Appl. No. PCT/EP2009/000575, 4 pages.

(Continued)

*Primary Examiner* — Andrea Wellington
*Assistant Examiner* — Nicole N Ramos
(74) *Attorney, Agent, or Firm* — Marshall, Gerstein & Borun LLP (57) ABSTRACT

A knife (1) for machining spot welding electrodes (2) includes one or more cutting edges (3) for machining the spot welding electrodes (2) and one or more diverting devices (7) for diverting removed spot welding electrode material that occurs during the cutting process away from the area of the knife (1). The knife (1) has a cutting edge (3) and an associated diversion device (7). The cutting edge (3) and the associated diversion device (7) are formed in one piece. The knife (1) can be a component of an electrode cutting tool. A cap cutter that includes the knife (1) and/or the electrode cutting tool is also disclosed.

23 Claims, 6 Drawing Sheets (56) References Cited

FOREIGN PATENT DOCUMENTS

| | | | | |
|---|---|---|---|---|
| EP | 1520647 | A1 * | 4/2005 | |
| FR | 2846897 | | 5/2004 | |
| JP | 62144885 | A * | 6/1987 | |
| JP | 04371374 | A * | 12/1992 | |
| JP | 06091381 | A * | 4/1994 | |
| JP | 08010967 | A * | 1/1996 | |
| JP | 08252758 | A * | 10/1996 | |
| JP | 2001062571 | A * | 3/2001 | |
| JP | 2008023589 | A * | 2/2008 | |
| JP | 2008073716 | A * | 4/2008 | |
| WO | 2006/043867 | | 4/2006 | |

OTHER PUBLICATIONS

Office Action for Chinese Patent Application No. 200980107423 dated May 22, 2012.
International Search Report, PCT/EP2009/000575, May 8, 2009.

* cited by examiner

KNIFE FOR THE MACHINING OF SPOT WELDING ELECTRODES, CUTTING TOOL AND CAP CUTTER

The invention relates to a knife for machining spot welding electrodes and an electrode cutting tool for the said knife and a cap cutter.

In order to permanently join sheet metal parts together welding robots with welding tongs are often employed in industrial facilities such as for example car manufacturing plants. During a welding process the welding tongs press two opposite sides in each case of two or more sheet metal parts together, whereby an electric current flows through the spot welding electrodes fitted in the arms of the welding tongs so that the sheet metal parts are welded together precisely. After approximately one hundred to three hundred welding processes the spot welding electrodes are so worn or coated with welding residues that reliable welding can no longer be guaranteed.

The welding electrodes generally have replaceable caps. However, they may also be of one-part construction without caps of this nature. The following description equally relates to both cases, because the cutting tool according to the invention can be used just as well for one-part electrodes as well as for electrodes with caps.

In order to restore the worn spot welding electrode tips to their original shape, the said tips are reworked with the aid of an electrode cutter. For the repair of the worn spot welding electrodes, which are composed of relatively soft copper, up to 0.3 mm of material, typically in the form of shavings, is removed from the spot welding electrode tips.

In order to be able to ensure trouble-free cutting, it is important that material removed during the cutting process is removed as quickly and as residue-free as possible from the region of the knife, because otherwise there is the risk of clogging the cutting tool. Cleaning an electrode cutting tool normally results in the complete welding process being interrupted for a longer time period which leads to enormous consequential costs due to loss of production or the scrap produced.

From the European patent specification EP 0 844 040 an electrode cutting tool is known with a concave indentation adjacent to the cutting blade. This concave indentation is used for the accommodation and channelling of the shavings produced by the cutting blade. In this way clogging of the cutting tool should be avoided.

Therefore the object of the invention described in the following is to prevent the clogging of an electrode cutting tool with cut material, which is produced when reworking worn spot welding electrodes, more reliably than in the state of the art.

This object is solved with a knife according to Claim 1, an electrode cutting tool with the said knife according to Claim 13 and with a cap cutter according to Claim 16.

Further embodiments of the invention are disclosed in the dependent claims.

The knife for machining the spot welding electrodes comprises at least one cutting edge and at least one diversion device for diverting material, which is cut or removed from the spot welding electrodes. A diversion device is used to lead away the cut spot welding electrode material, which is mainly composed of shavings or small particles, from the region of the cutting tool. The leading away of the cut material is simplified such that in each case a cutting edge and an associated diversion device are formed as one-part.

A combined unit therefore consists of a cutting edge and an associated diversion device.

With the aid of compact units of this nature (consisting of cutting edge and diversion device) gaps are avoided where in other cases the cutting edge and the diversion device border one another. In this way, cut spot welding electrode material is prevented from being deposited or snagged in the said gaps, which would increase the risk of clogging the electrode cutting tool. In addition, a single unit, which for example has been manufactured from a single piece, exhibits a higher stability, which facilitates higher precision during cutting.

Preferably, the whole knife is formed in one-part so that all cutting edges and all diversion devices form one single unit. Typically, a knife comprises two cutting edges each with the associated diversion devices, whereby the cutting edges point in opposite directions so that two spot welding electrodes (of one pair of welding tongs) can be machined simultaneously with one knife. The knife can also be composed of a plurality of parts as long as one or two cutting edges are formed in one part with the respective diversion device.

The complete knife preferably consists of a material which has a uniform chemical composition. There are though possibilities that either the material used in the complete knife has homogeneous material properties or that the material has various material properties. For example, the material is harder in the region of the cutting edges than in the other regions of the knife, by means of which it is ensured that more severely stressed regions (cutting edges) are more resilient than less stressed regions.

In addition, the binding of material can be avoided in that the transition between in each case a cutting edge and the associated diversion device is rounded off, by means of which edge regions which are difficult to access are avoided.

A one-part knife or a one-part unit consisting of a cutting edge and a diversion device can, for example, be produced from one casting or originate from one sinter process. Preferably, the cutting edges are also reworked. During reworking it is possible for example, to bring the cutting edges into the required shape by cutting and/or grinding or by wire electro-erosion or cavity sinking electro-erosion or to harden or sharpen the cutting edges.

With regard to the diversion devices, it is possible to coat them with a protective covering, such as for example with materials containing titanium or aluminium oxide or with a nano-coating. Coatings of this nature can serve as wear protection in that local heating is prevented by improved thermal conduction and/or by reduced friction.

Moreover, the diversion devices can have an indentation, such as a cavity or channel, so that the cut-off spot welding electrode material can be more easily diverted. Or there is the possibility that the surface of the diversion device is flat in one direction (has no bends) so that the cut-off material can easily slide in the unbent direction along the plane.

Preferably, the knife has a shape such that the end which is located closer to the axis of rotation is of smaller dimensions than the end which is remote from the axis of rotation, so that the shape of the knife is approximately like a truncated pyramid. A geometrical shape of this nature takes into account that cut-off material arising along the cutting edges is moved by centrifugal forces from inside (near the axis of rotation) to the outside (more remote from the axis of rotation), so that the amount of material to be diverted from inside to the outside increases. Consequently, a geometrical shape of this nature helps in avoiding clogging (above all in the outer region). It is therefore desirable that in addition to the different heights of the two ends of the knife (which is practicable anyway due to the shape of the spot welding electrode tips) also the widths of the two ends (face sides) of the knife are different, so that the knife is wider at a greater distance to the axis of rotation than close to the axis of rotation.

The knife according to the invention is typically fixed in an electrode cutting tool, which preferably comprises two mountings, also known as carcasses. The mountings are essentially cylindrically shaped and have internal recesses which serve to accommodate the knife. During a cutting process one of the mountings rotates about its (cylindrical) axis of symmetry. Furthermore, the mountings are typically formed such that, as well as their holding function for the knife, they also provide guidance of the spot welding electrodes to be machined.

A cap cutter comprises a cutting tool or a knife as described further below or above. A cap cutter of this nature comprises for example also a motor and possibly a gear train for the rotating drive of the cutting tool. Also an associated controller can be provided for the motor as well as switching means for switching the motor on and off.

Further aspects of the preferred and possible embodiments of the invention are clarified based on FIGS. 1, 2 and 3. The following are illustrated.

Figure 1:
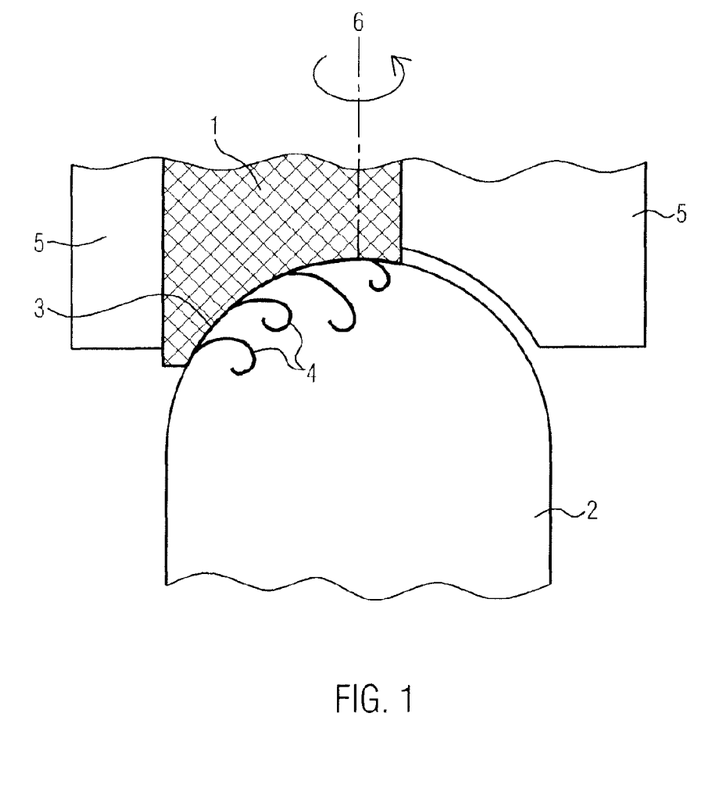
FIG. 1 a schematic cross-sectional view of a knife with mounting and spot welding electrode tip to be machined.

FIG. 1 shows schematically a cross-section of a knife 1 which is fitted in a mounting 5 and rotates with the mounting about the axis of rotation 6 in the direction of the arrow. The knife 1 moves around the tip of a spot welding electrode 2 such that the cutting edge 3 cuts off or removes material 4 from the tip of the spot welding electrode 2. The spot welding electrode material 4 produced during this process must be removed as efficiently as possible with the aid of one or several diversion devices 7 (illustrated in FIG. 2) from the region of the knife or of the spot welding electrode tip, so that material 4 does not clog the knife 1 or the electrode cutting tool.

Figure 2:
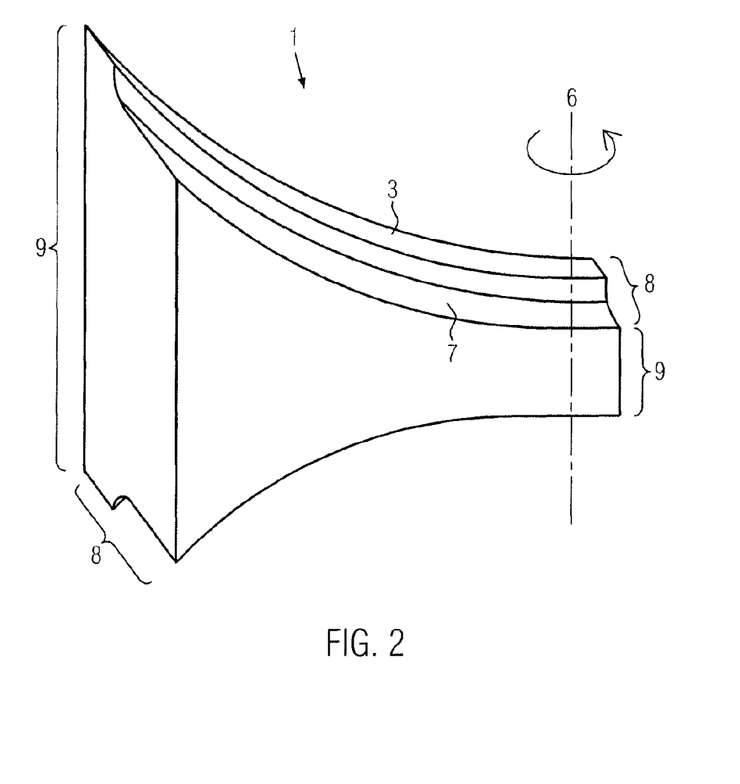
FIG. 2 a schematic illustration of a knife.

FIG. 2 shows a schematic view of a knife with indicated axis of rotation 6. The diversion device 7 connects seamlessly to the cutting edge 3, because both are formed from one part. A second cutting edge with diversion device is indicated in the lower part of the illustration. On the part located in the vicinity of the axis of rotation 6 the knife 1 has a smaller width 8 and height 9 than on the part remotely located from the axis of rotation 6, where the width 8 and the height 9 are each larger. Whereas the width of the cutting edge 3 is typically constant, the width of the diversion device 7 increases preferably with increasing distance from the axis of rotation 6, which enables the cut-off material 4 to flow away more easily. The illustrated knife 1 is formed as one-part or consists of a single piece.

Moreover, it can be seen in FIG. 2 that the transition between the cutting edge 3 and the diversion device 7 is rounded off, so that deposition of cut-off material 4 is only possible with difficulty. The radial shape of the cutting edge 3 is produced such that the spot welding electrodes 2 to be machined at the tip are restored to their original shape during cutting. A diversion device 7 has a lower height 9 (along the axis of rotation) than the associated cutting edge 3 so that sufficient space remains for transporting away the cut-off material 4. Embodiments are possible in which the surface of the diversion device 7 either runs essentially parallel to the cutting edge 3, or in which the distance of the surface of the diversion device 7 to the cutting edge 3 is greater towards the axis of rotation 6 than for greater distances to the axis of rotation 6, so that with small distances from the axis of rotation 6 more space is available for the diversion of the cut-off material 4.

An embodiment is also advantageous in which the distance between the cutting edge 3 and surface of the diversion device 7 always increases starting from the axis of rotation. In this way, towards the outside there is an increasing amount of space available for shavings arising along the cutting edge. Also, the distance can initially increase and then remain constant or decrease again. In this way a relatively smooth curvature of the surface can be obtained, simplifying the diversion of shavings.

Figure 3:
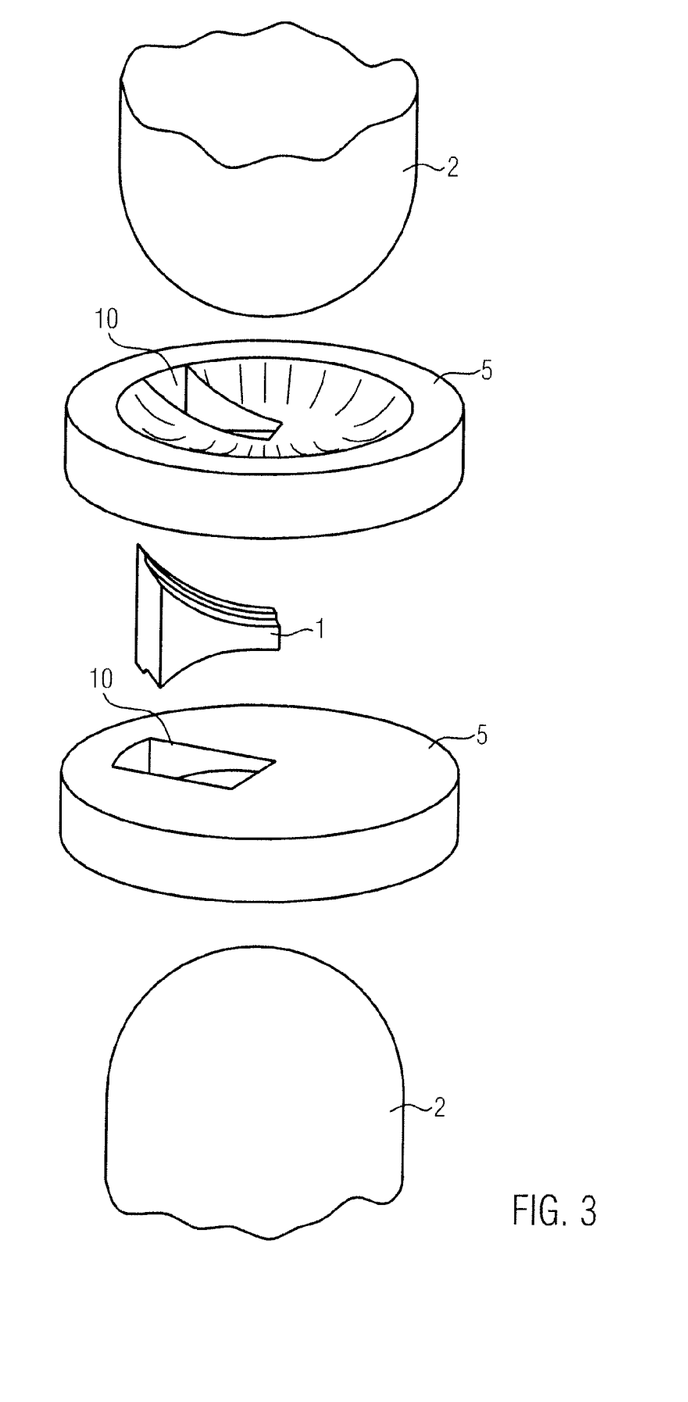
FIG. 3 a schematic view of an electrode cutting tool with knife and two mountings, as well as two spot welding electrode tips.
Figure 4A:
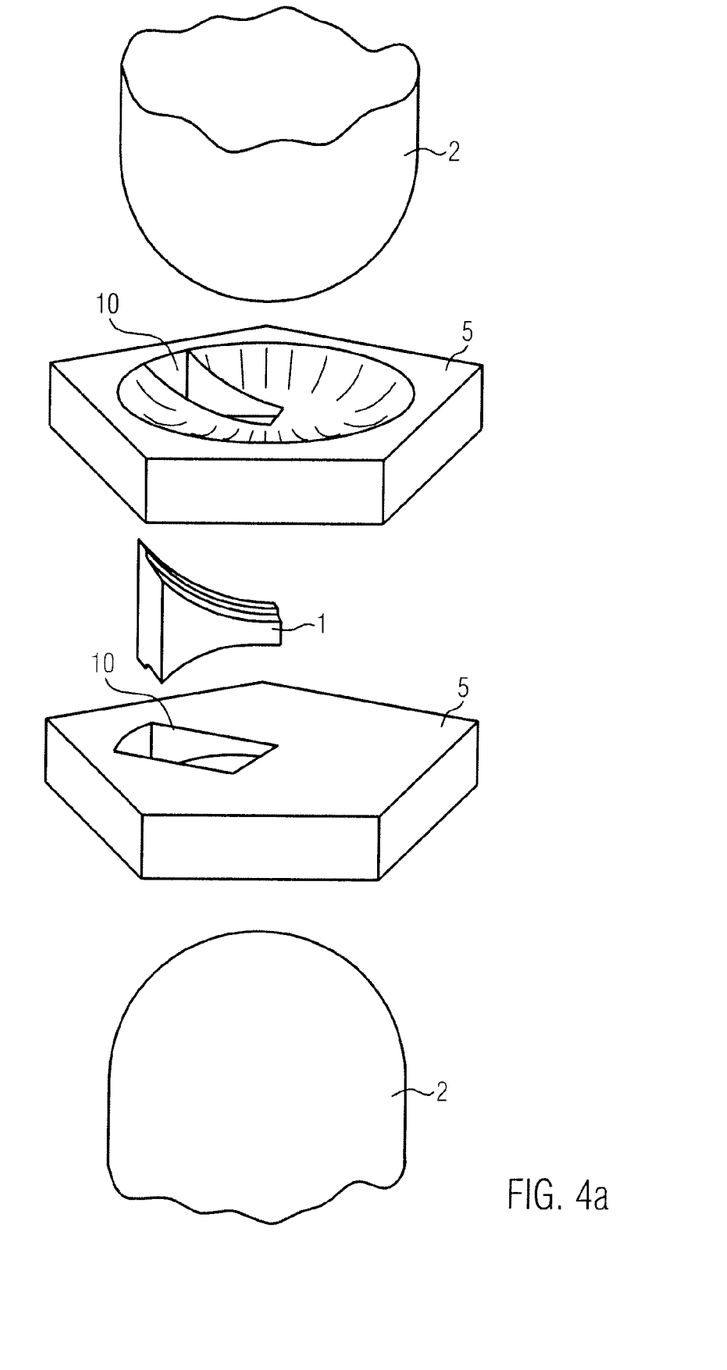
FIG. 4a is an illustration similar to FIG. 3, with a cylinder of pentagonal cross-section.
Figure 4B:
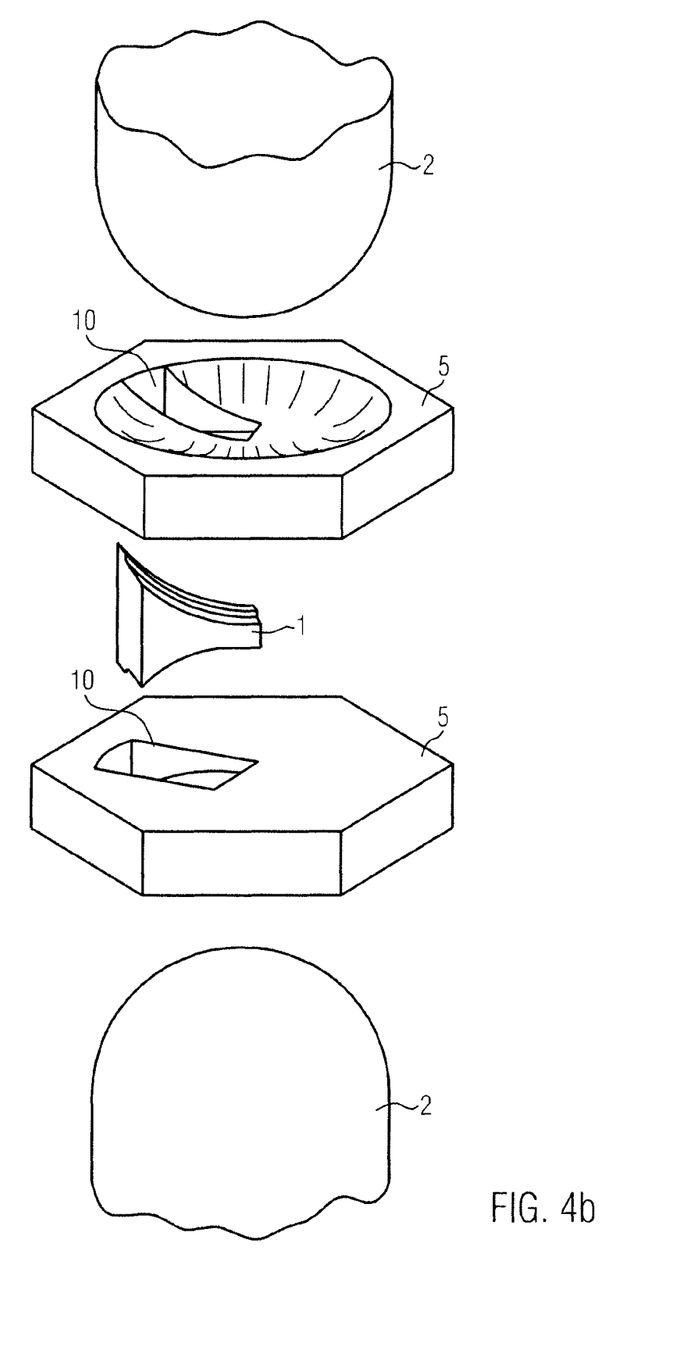
FIG. 4b is an illustration similar to FIG. 3, with a cylinder of hexagonal cross-section.
Figure 4C:
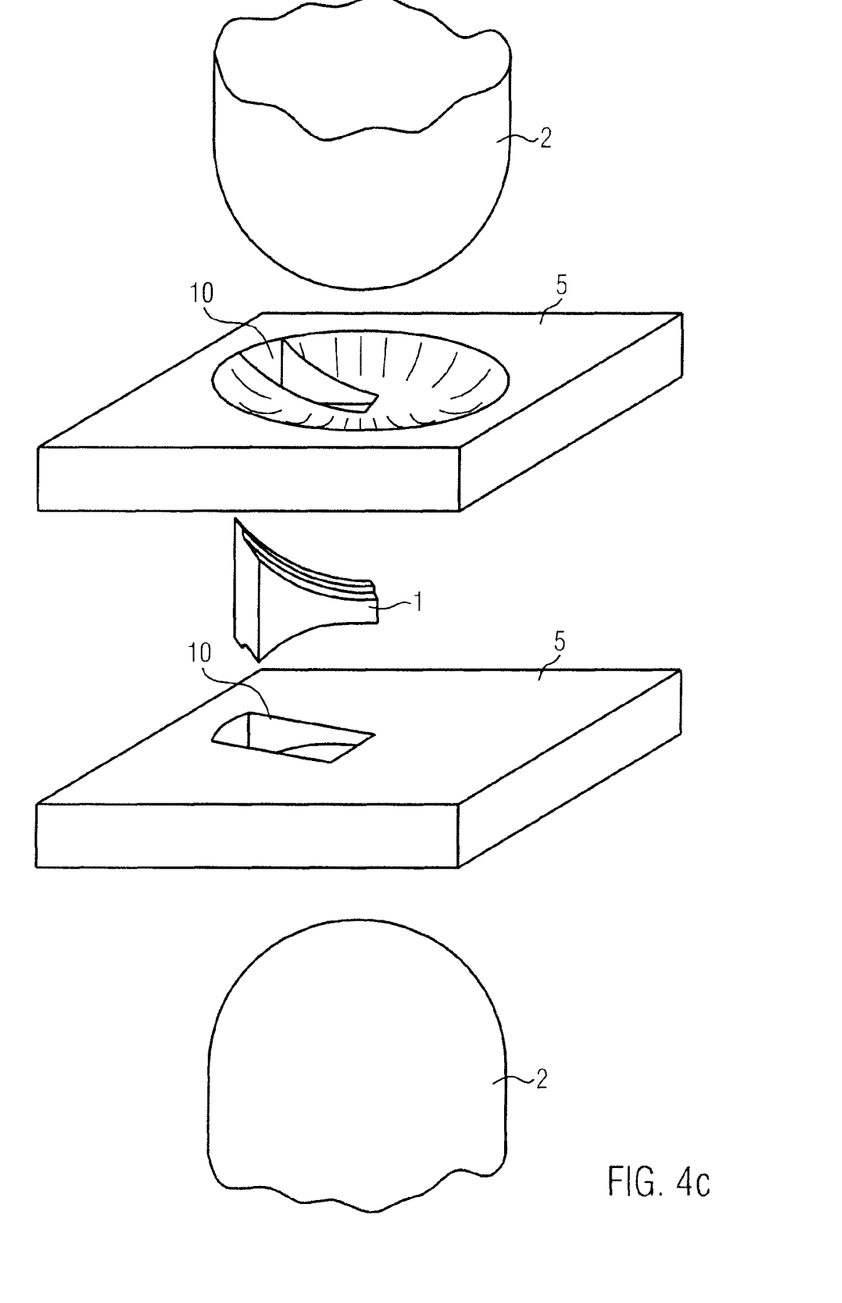
FIG. 4c is an illustration similar to FIG. 3, with a cylinder of rectangular cross-section.

FIG. 3 illustrates a schematic view of an electrode cutting tool, consisting of two mountings 5 with recesses 10 and a knife 1, as well as two spot welding electrodes 2 with the tips indicated in each case. The knife 1 is shown turned slightly for better illustration. The recesses 10 are arranged such that they can accommodate the knife 1 from below or from above. In the closed state (holding state) the knife 1 and the mountings 5 are joined together such that the recesses 10 are almost completely filled by parts of the knife 1. Consequently, an approximately smooth surface is created from which only the topmost parts of the cutting edges 3 protrude. These surfaces are formed such that they can accommodate the tips of the spot welding electrodes 2. Optionally, the mountings 5 also comprise recesses through which cut-off spot welding electrode material 4 can be better diverted.

What is clamed is:

1. A knife for machining spot welding electrodes comprising one or more cutting edges for machining the spot welding electrodes; and one or more diversion devices for diverting removed spot welding electrode material produced during the cutting process from a region of the knife, comprising
    in each case a cutting edge and an associated diversion device are formed as one part;
    an end of the knife closely located to an axis of rotation has smaller dimensions than an end of the knife located remotely from the axis of rotation;
    wherein the dimension is a width and is different in the direction perpendicular to the axis of rotation, and
    each transition between a cutting edge and a diversion device is rounded off.

2. A knife according to claim 1, wherein the complete knife is formed as one part.

3. A knife according to claim 1, wherein the material comprising the cutting edges and the diversion devices has homogeneous properties.

4. A knife according to claim 1, wherein the material comprising the cutting edges and the diversion devices is harder on the cutting edges than in the remaining region.

5. A knife according to claim 1, wherein a unit, comprising in each case a cutting edge and a diversion device, is produced from one casting or originates from one sinter process.

6. A knife according to claim 5, wherein the cutting edges are additionally reworked.

7. A knife according to claim 6, wherein the cutting edges are cut.

8. A knife according to claim 6, wherein the cutting edges are hardened.

9. A knife according to claim 1, wherein at least the diversion devices are coated with a protective covering against wear.

10. A knife according to claim 1, wherein at least one of the diversion devices is a cavity.

11. A knife according to claim 10, wherein the diversion device has a surface for diverting the spot welding electrode material, which is curved in a radial direction.

12. A knife according to claim 11, wherein the surface for diverting the spot welding electrode material is not curved at least in one region in another direction.

13. An electrode cutting tool with a knife according to claim 1 with at least one mounting.

14. The electrode cutting tool according to claim 13, wherein the at least one mounting is essentially shaped as a cylinder, and comprises one or more recesses for accommodating the knife in an inner region of the least one mounting.

15. An electrode cutting tool according to claim 14, wherein the mountings are shaped as circular cylinders.

16. An electrode cutting tool according to claim 14, wherein at least one of the cylinders has a rectangular cross-section, a pentagonal cross-section, or a hexagonal cross-section.

17. The electrode cutting tool according to claim 14, wherein the one or more recesses of the at least one mounting simultaneously provide accommodation and guidance of the spot welding electrodes to be machined.

18. A cutter for caps of spot welding electrodes with an electrode cutting tool according to claim 13.

19. An electrode cutting tool according to claim 13 comprising at most two mountings.

20. A cutter for caps of spot welding electrodes with a knife according to claim 1.

21. A knife according to claim 1, wherein at least one of the diversion devices is an indentation.

22. A knife according to claim 1, wherein at least one of the diversion devices is a channel.

23. A knife according to claim 1, wherein the dimensions is a height and is different in the direction of the axis of rotation.

* * * * *